April 19, 1927.
W. A. LOTH
1,625,369
METHOD AND DEVICE FOR RAPIDLY SOLVING ORDINARY PROBLEMS
OF ASTRONOMIC NAVIGATION
Filed Oct. 3, 1923
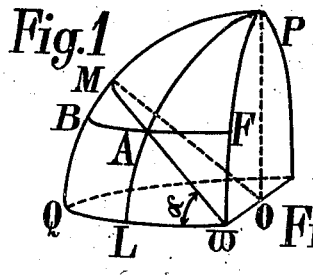
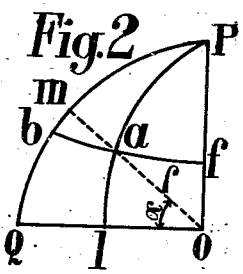
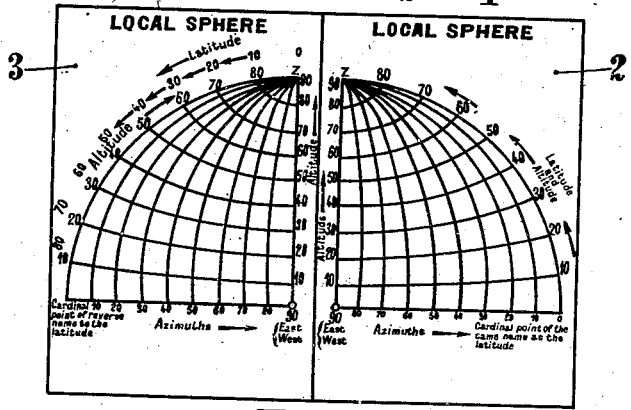
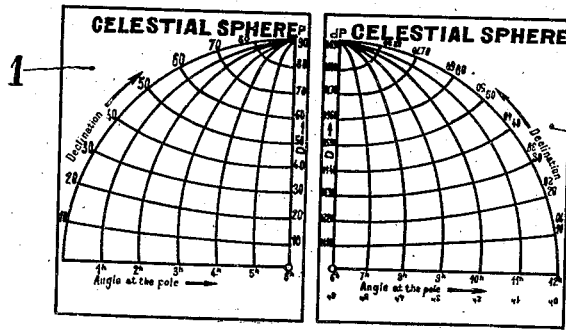
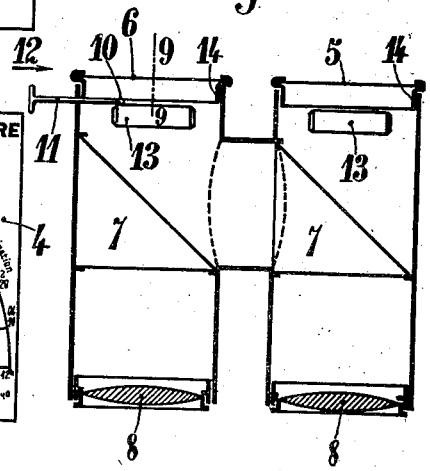
Inventor
W. A. Loth
By Marks & Clerk
Attys.

Patented Apr. 19, 1927.

1,625,369

UNITED STATES PATENT OFFICE.

WILLIAM ARTHUR LOTH, OF PARIS, FRANCE, ASSIGNOR TO SOCIETE INDUSTRIELLE DES PROCEDES W. A. LOTH, OF PARIS, FRANCE.

METHOD AND DEVICE FOR RAPIDLY SOLVING ORDINARY PROBLEMS IN ASTRONOMIC NAVIGATION.

Application filed October 3, 1923, Serial No. 666,394, and in France October 5, 1922.

Apparatus is already known which permits of the solution for deep sea navigation of astronomical problems and in which it was proposed to use two diagram plans obtained by projection of the celestial sphere and of the local sphere on a plan of the local meridian. These diagrams could be superposed and relatively displaced so that in determining the position of a star upon the graduations of the projection of the celestial sphere placed as to altitude in coincidence with the projection of the local sphere the corresponding co-ordinates could be read upon the latter or the position of other stars could be determined. The problem to be dealt with in order to obtain these diagram plans consisted therefore of the transformation by projection of spherical triangles into plane triangles. This method however afforded but a rough approximation as the conditions of similarity in the case of spherical triangles are not the same as those in the case of plane triangles. Under these circumstances the relations as to position of points on these diagrams were not analogous to the relations as to position of points on the corresponding spheres. The bearings were therefore inaccurate and the apparatus useless in practice.

The present invention has for its object the avoidance of these disadvantages and in essence consists in obtaining the various points on the diagram plans representing the celestial sphere and the local sphere by projection on a plan of the great circles passing through the points in question on said spheres the position of the points on the radial lines thus obtained being determined by extending along the corresponding radial line from the commencing point a length satisfying the equations of resolution of the spherical triangle formed on the sphere by the great circle and the meridian passing through the point in question and by the corresponding portion of the equatorial circle.

In the accompanying drawings and by way of example:

Figs. 1 and 2 are explanatory diagrams of the characteristic features of the method forming the subject-matter of the invention.

Figs. 3 and 4 relate to means devised for carrying out the said method.

Fig. 5 diagrammatically illustrates in vertical section another form of construction of the means permitting the application of the said method.

As above indicated the execution of the diagram plans which are to represent the celestial and local spheres is based upon the following theoretical data:

A being any point on a sphere, BF its parallel circle, PL its meridian and A$\varpi$ the arc of the great circle passing through A and $\varpi$, the following equations will be obtained:

(1) $\quad \sin. A\varpi = \dfrac{\sin. AL}{\sin. A\varpi L}$ (2) $\cot. A\varpi = \cot. \varpi L \times \cos. A\varpi L$ If we consider an azimuthal projection, that is to say such that the representation of the arc of great circle A$\varpi$ is a straight line $ao$ such that $L\varpi A = Qom = \alpha$ this projection made on the meridian plane QOP must satisfy equations (1) and (2).

For simplification, we shall write:

$$\varpi A = \rho$$
$$F\varpi = BQ = AL = \varphi$$
$$\varpi L = L.PO\varpi = \lambda''$$

If, in the equations (1) and (2), these new designations are substituted and that the logarithms are taken, one will obtain:

(3) log. sin. $\rho$ = log. sin. $\varphi$ + colog. sin. $\alpha$ (4) log. cotg. $\rho$ = log. cotg. $\lambda$ + log. cos. $\alpha$ $\alpha$ being the independent variable. These equations permit to calculate the rectangular coordinates of each point of a parallel $\varphi$ or of a meridian $\lambda''$.

It is clear therefore that to obtain the diagram plans representing the celestial and local spheres the great circles passing through the points in question on said spheres are projected on a plan and the position of the points on the radial lines thus obtained are then determined by the extension along the corresponding radial line from the commencing point a length satisfying the equations of resolution of the spherical triangle formed on the sphere by the great circle and the meridian passing through the point in question and by the corresponding portion of the equatorial circle. The diagram plans thus obtained can be then superposed in the known manner and displaced through an angle for the solving of the astronomical problem set.

It is preferable however to obtain an optical superposing of the diagrams instead of applying them directly one above the other.

To this end the plane surface 5 (Fig. 5) bears projections of the local sphere and the plane surface 6 those of the celestial sphere.

Owing to a set of mirrors or prisms 7 and of lenses 8, the image of one of the projections can be superposed on the image of the other. The result of this superposition can be observed directly or after enlargement obtained by the ordinary known means.

The surface 6 can be angularly displaced about an axis 9—9 and any one of its points can describe a circle.

For fixing the position of the star, use is made of a dark spot which will be visible on a clear or luminous back ground. In order to cause the spot to occupy any desired position, use can be made of any suitable adjusting means. By way of example, this spot 10 may be carried by a rod 11 (a silvered rod or the like) movable in the direction of the arrow 12, that is to say radially with respect to the axis 9—9. Use may also be made of two fine wires or spider lines located in parallel planes. By rotating the diagrams about their axes the crossing point of the wires can be brought to any point of the plane 6 for fixing the position of the star on the diagram representing the superposed images of the projections of the local and celestial spheres.

The apparatus may take the form of a telescope or of a field glass. In the latter case, use is made of direct reflection or of reciprocal reflections. The apparatus can also be mounted as a stereoscope to give the effect of relief (anaglyphs, etc.).

The surfaces bearing the diagrams are made of a material transparent to light and undistortable (quartz for instance). They are ground and bear, engraved on them the projections of the local and celestial spheres. They are lighted by natural or artificial light falling on the faces opposed to the observation faces. By way of example, the field glass bodies can be provided with lighting apertures 13. It is obvious that the surfaces 5—6 may be held in mounting 14 secured on the bodies of the apparatus, in order to allow of their assemblage and removal.

Instead of obtaining the optical superposition of the images by reflected luminous rays (by using, for instance a field glass), it is also possible to obtain it by direct luminous rays (utilization of a telescope for instance).

In the case of optical superposition by direct rays, it is possible to add to the telescope (used for instance for that purpose) a second telescope to which the other eye of the observer can be applied. This second telescope, which can be obturated at will is used for a purpose different from that above described (vision at a long distance by means of a telescope, etc.). Utilizing the method forming the subject-matter of this invention and the apparatus for carrying it into effect, the operation of determining a ship's position is reduced to about two minutes and the possible errors of calculation are avoided.

What I claim as my invention and desire to secure by Letters Patent is:

1. In a system for rapidly solving problems of astronomical navigation, diagram plans of the local sphere, diagram plans of the corresponding celestial sphere, and means for movably supporting the plans with respect to each other and for superposing said plans.

2. In a system for rapidly solving problems of astronomical navigation including diagram plans of corresponding local and celestial spheres provided with co-operating systems of rectangular co-ordinates and polar co-ordinates of points located on said spheres, and means for movably supporting and for superposing said plans.

3. A system for rapidly solving problems of astronomical navigation including diagram plans of local and celestial spheres provided with projections on the azimuthal plane of great circles passing through the points of said spheres, these great circles being projected according to diameters, in the azimuthal plane and the positions of the projections of the points of the spheres on the corresponding diameters being obtained, by placing, on the said diameters and from the center, lengths the values of which are obtained by transforming, by calculation, the spherical triangles formed by the periphery of the equatorial circle, the great circle and the meridian passing through the considered points in plane triangles contained in the azimuthal plane, and means for movably supporting and for superposing said plans.

4. A method for rapidly solving problems of astronomical navigation consisting in projecting plans of local and celestial spheres on the azimuthal plane of great circles passing through the points of said spheres, these great circles being projected according to diameters, in the azimuthal plane and the positions of the projections of the points of the spheres on the corresponding diameters being obtained, by placing, on the said diameters and from the center, lengths the values of which are obtained by transforming, by calculation, the spherical triangles formed by the periphery of the equatorial circle, the great circle and the meridian passing through the considered points in plane triangles contained in the azimuthal plane, and finally relatively moving and superposing the plans.

5. A system as claimed in claim 1, wherein the diagram plans are provided on non-dilatable transparent surfaces.

6. A system for rapidly solving problems of astronomical navigation including diagram plans of local and corresponding celestial spheres, transparent quartz surfaces upon which the plans are provided, ocular mountings for said plans, and means for receiving and supporting the mountings so that the plans may be moved relatively and optically superposed with respect to each other.

7. A system as claimed in claim 6, wherein the means for supporting the oculars include spaced tubes, a lens fitted in the end of each tube opposite the ocular mounting thereof, a reflecting surface in one portion of the field lens, a reflecting and transparent surface in the other portion of the field lens, a passageway connecting the field glass members at the point of one surface to superpose on one of said surfaces the two images of the diagram plans, substantially as and for the purposes set forth.

8. In an apparatus for rapidly solving problems of astronomic navigation, a graphic representation of the projection of the local sphere on the meridian plane of the spot or place, a graphic representation, having the same dimensions as the preceding one, of the projection of the celestial sphere on the meridian plane of the spot or place, supporting means on which these two graphic representations may be orientated relatively to each other so as to represent the common projection of the two spheres at the place under consideration, means for determining the position of the star by any two of its coordinates, for permitting the reading of the unknown coordinates.

9. In an apparatus for rapidly solving problems of astronomic navigation, a graphic representation of the projection of the local sphere on the meridian plane of the spot or place, a graphic representation, having the same dimensions as the preceding one, of the projection of the celestial sphere on the meridian plane of the spot or place, a transparent support for this latter graphic representation, supports upon which these two graphic representations may be orientated and superposed relatively to each other, the centres of projection remaining mingled together, so as to represent the common projection of the two spheres at the place under consideration, means for determining the position of the star by any two of its coordinates, for permitting the reading of the unknown coordinates.

10. In an apparatus for rapidly solving problems of astronomic navigation, a graphic representation of the projection of the local sphere on the meridian plane of the spot or place, a graphic representation, having the same dimensions as the preceding one, of the projection of the celestial sphere on the meridian plane of the spot or place, a transparent support for each of these graphic representations, means for luminously projecting these graphic representations so that their images are superposed, the centres of projections being mingled together, supports upon which these representations may be orientated relatively to each other so that the resulting image represents the common projection of the two spheres at the place under consideration, means for determining the position of the star by any two of its coordinates, for permitting the reading of the unknown coordinates.

11. In an apparatus for rapidly solving problems of astronomic navigation, a graphic representation of the projection of the local sphere on the meridian plane of the spot or place, a graphic representation, having the same dimensions as the preceding one, of the projection of the celestial sphere on the meridian plane of the spot or place, a transparent support for each of these graphic representations, a field glass mounting receiving at each eye-piece one of the graphic representations, an optical system permitting the superposition of the images, the centres of projection being mingled together, means permitting one of the graphic representations to turn in the eye-piece corresponding thereto, a movable spot permitting to determine the position of the star by any two of its coordinates and the reading of the unknown coordinates.

In testimony whereof I have signed my name to this specification.

WILLIAM ARTHUR LOTH.